United States Patent
Fatemi et al.

(10) Patent No.: US 10,855,217 B2
(45) Date of Patent: Dec. 1, 2020

(54) POWER ELECTRONICS DRIVE FOR CYLCOIDAL ELECTRIC MACHINE

(71) Applicant: GM Global Technology Operations LLC, Detroit, MI (US)

(72) Inventors: Alireza Fatemi, Canton, MI (US); Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 16/396,075

(22) Filed: Apr. 26, 2019

(65) Prior Publication Data

US 2020/0343846 A1 Oct. 29, 2020

(51) Int. Cl.
| | |
|---|---|
| *H02P 25/086* | (2016.01) |
| *H02K 11/21* | (2016.01) |
| *H02K 11/27* | (2016.01) |
| *H02K 41/06* | (2006.01) |
| *H02K 11/33* | (2016.01) |

(52) U.S. Cl.
CPC ............ *H02P 25/086* (2013.01); *H02K 11/21* (2016.01); *H02K 11/27* (2016.01); *H02K 11/33* (2016.01); *H02K 41/065* (2013.01); *H02K 2201/03* (2013.01); *H02K 2201/18* (2013.01)

(58) Field of Classification Search
CPC ............................. H02P 25/086; H02K 11/21
USPC .......................................................... 318/115
See application file for complete search history.

(56) References Cited

U.S. PATENT DOCUMENTS

| | | |
|---|---|---|
| 4,914,330 A | 4/1990 | Pierrat |
| 5,448,117 A | 9/1995 | Elliott |
| 9,669,701 B2 | 6/2017 | Bolt |
| 9,890,832 B2 | 2/2018 | Kurth et al. |
| 10,023,406 B2 | 7/2018 | Klubertanz et al. |
| 10,090,747 B2 | 10/2018 | Hofmeister |
| 2017/0110956 A1* | 4/2017 | Morris ................. H02K 49/102 |
| 2019/0222096 A1* | 7/2019 | Bastian, II ............... H02K 1/27 |

* cited by examiner

*Primary Examiner* — Kawing Chan
(74) *Attorney, Agent, or Firm* — Quinn IP Law

(57) ABSTRACT

An electrical system includes a power inverter module (PIM) connected to DC and AC voltage buses and having a pair of inverter phase legs, at least one of which includes a plurality of semiconductor switche. A cycloidal electric machine with plurality of electrical phases is connected to the PIM via the AC voltage bus, and has a stator and a rotor with eccentric stator and rotor axes. The rotor moves with two degrees of freedom, including rotating motion about the rotor axis and orbiting motion about the stator axis. A controller applies, for each respective phase, a phase-specific offset value to a carrier signal and to a voltage reference signal. This generates a modified carrier signal and a modified reference signal, respectively, which in turn generate a pulse width modulation (PWM) signal. The electric machine is powered via the PIM by energizing the semiconductor switches using the PWM signal.

19 Claims, 7 Drawing Sheets

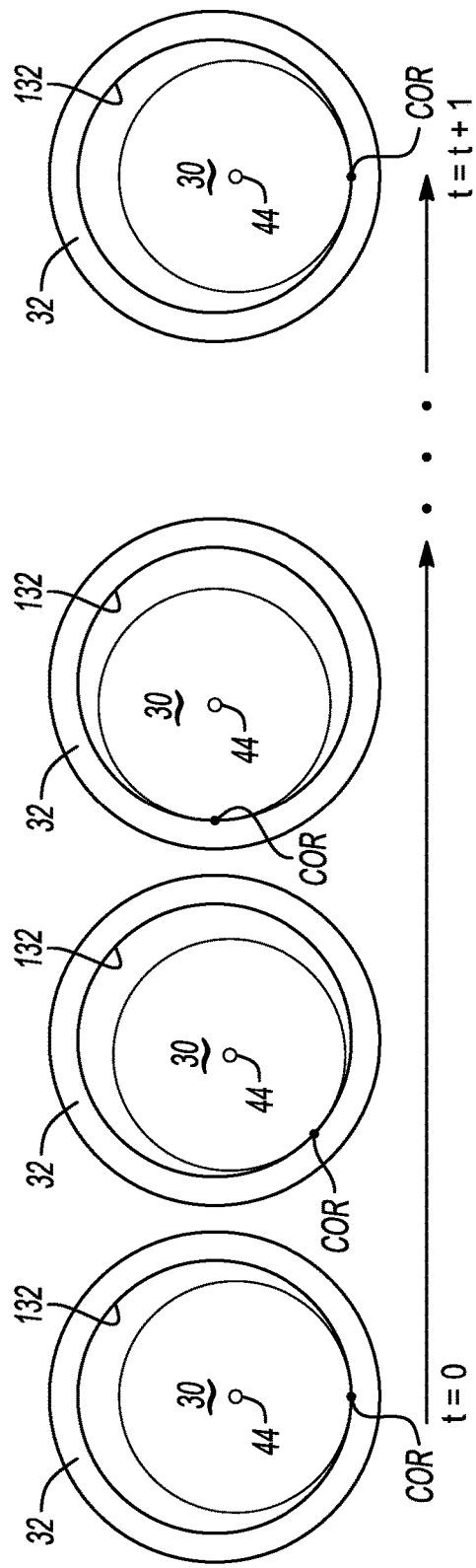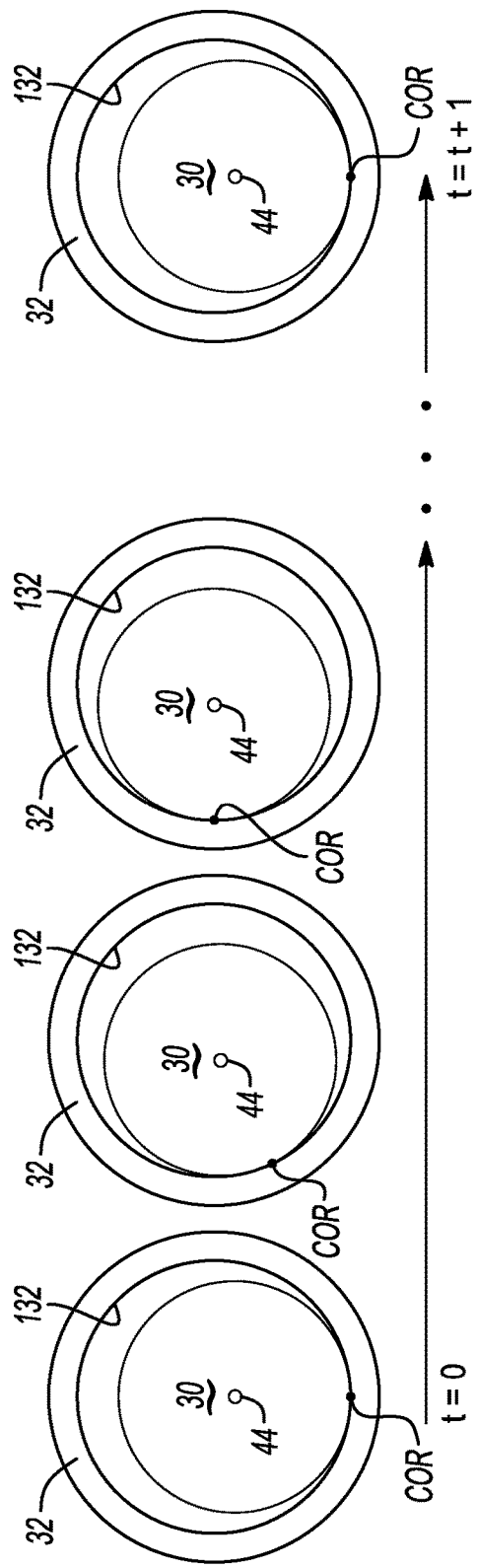

POWER ELECTRONICS DRIVE FOR CYLCOIDAL ELECTRIC MACHINE

INTRODUCTION

Rotary electric machines configured as motors or electric generators include a rotating member ("rotor") and a stationary member ("stator"). The rotor may be disposed radially within or outside of the stator, with the center axes of the rotor and stator typically coinciding such that the stator and rotor are concentric. Radial slots are defined between equally-spaced stator teeth, with the teeth projecting radially from a perimeter wall of a cylindrical stator core. The stator slots are filled with copper windings. Stator electromagnets and corresponding stator poles are formed when such stator windings are energized. For instance, a polyphase input voltage may be sequentially applied to phase leads of the various stator windings to generate a rotating magnetic field.

Magnetic reluctance motors are of particular type of rotary electric machine frequently used in higher-power/higher-torque applications. In a variable reluctance motor, for instance, magnetic poles are induced in a ferrous rotor core when the above-noted stator windings are energized. Forces generated by magnetic reluctance of the ferrous rotor core cause the rotor's magnetic poles to seek alignment with the nearest stator pole. That is, as magnetic flux passes through the rotor core and follows the path of least reluctance, the nearest rotor pole will attempt to align itself with the most proximate stator pole. However, as the stator field continues to rotate, so too does the rotor, with the stator poles leading the rotor poles so as to produce desired machine rotation.

SUMMARY

The present disclosure relates to improvements in the control architecture used for regulating the ongoing operation of reluctance-based rotary electric machines and other radial flux-type electric machines having a stator and an eccentrically-positioned rotor, i.e., a cycloidal electric machine. As described below, rotor eccentricity enables the rotor to orbit with respect to the stator, for instance radially within a surrounding cylindrical stator core. As the rotor's output shaft rotates about its own axis of rotation while the rotor itself orbits within the stator, the rotor of the disclosed cycloidal electric machine moves with two degrees of freedom (2DOF) of motion. Rotor eccentricity also allows the rotor to be reduced in size relative to a typical concentric stator-rotor configuration.

The rotary electric machines described herein are "cycloidal" in the sense that the rotor is constrained to move with the 2DOF noted briefly above: (1) rotary or rolling motion of the rotor about the rotor's own axis of rotation, and (2) orbiting motion of the rotor about the stator's axis. For a typical concentric machine, electromagnetic torque within a radial stator-rotor airgap may be derived using the following equation [1], with t and r respectively denoting radial and tangential torque components in an example cylindrical coordinate system:

$$T_e = F_t R L_{ef} \quad [1]$$

In equation [1], $T_e$ is the electromagnetic torque in newton-meters, R is the average radius of the airgap in meters, $L_{ef}$ if the effective stack length of the active materials of the electric machine, also in meters, and $F_t$ is the tangential forces present within the airgap in newtons. The tangential forces, $F_t$, are defined as:

$$F_t = \frac{P}{2} \int_0^{2\pi} f_t(\phi_r) R d\phi_r \quad [2]$$

where P is the number of poles of the electric machine, $f_t$ represents the tangential component of the airgap force density per unit length, and $d\phi_r$ is the electrical angle covering each pole pair in radians. According to the relationships expressed in equations [1] and [2], radial airgap forces, which are several times larger than the tangential forces in the same airgap, do not contribute to output torque. The cycloidal/eccentric configuration of the present rotary electric machine is therefore intended to incorporate otherwise unused radial airgap forces into the output torque in order to realize certain performance advantages, including the production of higher levels of motor output torque at lower motor speeds with a rotor having reduced size.

Disclosed herein is a circuit topology for use with a polyphase cycloidal electric machine that is able to take advantage of the above-noted radial airgap forces. Each stator winding of the electric machine requires a separate excitation circuit to provide optimal controllability and operational flexibility. This requirement may lead to an increase in the number of power inverter hardware components and circuit complexity relative to electric machines having a concentric rotor-stator arrangement. The present approach thus simplifies the associated control circuit topology for the cycloidal electric machine, specifically by reducing the number of semiconductor switches and gate signal drive circuitry in conjunction with a modified pulse width modulation (PWM) control strategy.

Relative to a typical polyphase power inverter, e.g., one having upper and lower ("high" and "low") semiconductor switches arranged on each phase leg, the disclosed power inverter module (PIM) topology uses a reduced number of semiconductor switches and associated gate drive circuit hardware components. The semiconductor switches may be arranged in series in identical numbers along two phase legs, which may parallel to each other or concentric in different embodiments. The semiconductor switches of one of the phase legs may be optionally replaced by a respective capacitor to further reduce the number of semiconductor switches and gate drive circuit components, e.g., by a factor of $$0.25\left(1 - \frac{1}{m}\right) \times 100\%,$$

with m accounting for the number of phases or controlled outputs.

When the individual stator phases have an identical frequency, which is true for constant-speed operation of an example cycloidal reluctance motor described herein, then direct current (DC) bus utilization could be increased by sharing the modulation space between adjacent pole pairs of the stator. In such an instance, a regular triangular carrier waveform could be used as a basic carrier waveform, with the basic carrier waveform then shifted via a set of phase-specific offsets calculated based on the particular configuration of the electric machine, e.g., the number of stator poles. Passive boost circuits may be used to compensate for the diminished DC bus utilization, such as but not limited to impedance networks.

The disclosed excitation logic applies to stator poles/ phases of various numbers, e.g., three phases, eight phases, twelve phases, etc., with a non-limiting example eight-phase embodiment disclosed herein. A voltage reference signal is determined based on the rotor position, a torque command, and an operating mode (motoring or generating) of the electric machine. Depending on the present operating point of the electric machine, the present control strategy could lead to continuous or discontinuous current waveforms in the various stator windings.

In a disclosed embodiment, an electrical system includes a power inverter module (PIM) connected to a DC voltage bus and an AC voltage bus. The PIM has a pair of inverter phase legs, at least one of which includes a plurality of semiconductor switches. The electrical system includes a cycloidal electric machine with a plurality of electrical phases connected to the PIM via the AC voltage bus, and having a stator and a rotor with respective stator and rotor axes. The rotor axis is eccentric with respect to the stator axis, an airgap is defined between the stator and the rotor that is smaller at a center of rotation of the rotor than elsewhere around a circumference of the rotor, and the rotor moves with two degrees of freedom (2DOF), i.e., rotating motion about the rotor axis and orbiting motion about the stator axis.

Also included in the electrical system is a controller configured to apply, for each respective phase of the plurality of phases, a phase-specific offset value to a carrier signal and to a voltage reference signal to thereby generate a modified carrier signal and a modified reference signal, respectively. The controller also generates a pulse width modulation (PWM) signal using the modified carrier signal and the modified reference signal, and powers the cycloidal electric machine via the PIM by energizing the semiconductor switches using the PWM signal.

The phase-specific offset value is calculated by the controller as:

$$Offset_n = \frac{1}{m}(m + 1 - 2n)$$

where m is a total number of the phases of the cycloidal electric machine, n is a corresponding phase for the phase-specific offset value, n=1 for the uppermost terminal closest to the positive DC bus rail, and n=m for the lowermost terminal closest to the negative DC bus rail.

The inverter phase legs include parallel first and second inverter phase legs.

The semiconductor switches may include a first plurality of semiconductor switches connected in series with each other to form the first inverter phase leg, and a second plurality of semiconductor switches connected in series with each other to form the second inverter phase leg.

The first inverter phase leg may contain the plurality of semiconductor switches and the second inverter phase leg contains an equal plurality of capacitors.

The pair of inverter phase legs may include concentric first and second inverter phase legs. In such an embodiment, the concentric first and second inverter phase legs may be connected to a surface of the stator at a position immediately adjacent to the stator.

The electric machine may be embodied as a reluctance machine having at least eight phases.

A downstream coupling mechanism may be coupled to the rotor and a driven load, and may be configured to translate the 2DOF into 1DOF, i.e., rotating motion without the orbiting motion. The driven load may be a drive axle of a vehicle.

A method is also disclosed herein for controlling the cycloidal electric machine. An embodiment of the method includes receiving a set of input signals via a controller, including a torque command, a rotor position signal, and current signals. Responsive to the set of input signals for each respective phase of the plurality of phases, the method includes applying a phase-specific offset value to a carrier signal and to a voltage reference signal and thereby generate a modified carrier signal and a modified reference signal, respectively. A pulse width modulation (PWM) signal is generated via the controller using the modified carrier signal and the modified reference signal. The method includes transmitting the PWM signal to a plurality of semiconductor switches located on one or more phase legs of a power inverter module connected to the cycloidal electric machine to thereby power the cycloidal electric machine.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIGS. 3 and 4 are schematic illustrations of respective rotating and orbiting motion providing two degrees of freedom of motion of the rotary electric machine of FIG. 2.

Figure 1:
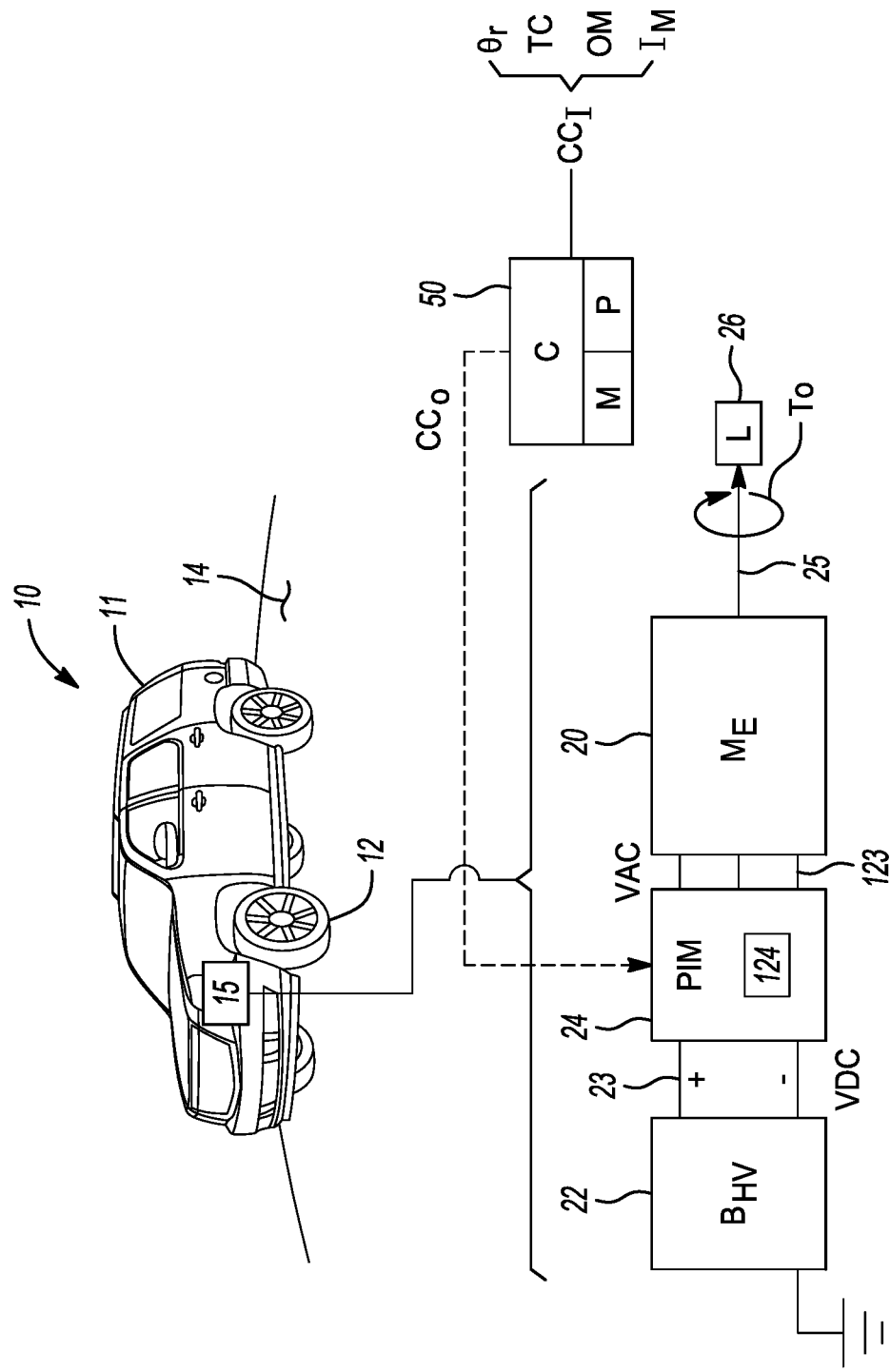
FIG. 1 is a schematic illustration of an example vehicular electrical system having a cycloidal rotary electric machine controlled via a power inverter module using the circuit topology disclosed herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, an electrical system 15 is shown schematically in FIG. 1. The electrical system 15 may be used in various systems, including as part of a drivetrain of a motor vehicle 10 having a vehicle body 11 and road wheels 12 in rolling contact with a road surface 14. The electrical system 15 may be used in other types of vehicles such as aircraft, watercraft, and rail vehicles, or in other mobile non-vehicular applications such as robots and mobile platforms. Stationary applications may likewise benefit from use of the electrical system 15, and therefore the motor vehicle 10 of FIG. 1 is just one possible beneficial application of the present teachings.

The electrical system 15 includes a polyphase cycloidal electric machine (ME) 20 and a controller (C) 50. The controller 50 is programmed to execute pulse width modulation (PWM) control logic 55 to change the ON/OFF switching states of a set of semiconductor switches 124 residing within a power inverter module (PIM) 24, with example embodiments of the PWM control logic 55 described below with reference to FIGS. 9 and 10 and optional arrangements of the semiconductor switches 124 described below with reference to FIGS. 6-8.

The cycloidal electric machine 20 has a rotatable output member 25 that is coupled to a rotor 30 (see FIG. 2) to deliver output torque (arrow To) to a coupled load (L) 26, e.g., the road wheels 12 or a drive axle (not shown). The rotor 30 is sufficiently balanced to provide a low level of noise, vibration, and harshness during operation of the cycloidal electric machine 20, and to ensure that rotor 30 does not wobble or vibrate beyond its constrained two degrees of freedom (2DOF).

As will be understood by those of ordinary skill in the art, reluctance machines, e.g., synchronous, switched, or variable reluctance machines, are characterized by an absence of permanent magnets on the rotor 30, and instead induce non-permanent magnetic poles on the rotor 30. The output torque (arrow To) is ultimately generated as a result of forces on the rotor 30 due to magnetic reluctance. The cycloidal electric machine 20 is operable for providing motion with the above-described 2DOF, i.e., rotary and orbiting motion as respectively shown in FIGS. 3 and 4.

In the illustrated non-limiting example embodiment of FIG. 1, the electrical system 15 includes a battery (BO 22 connected to the above-noted PIM 24. The battery 22 may optionally have a relatively high voltage capacity, e.g., 60-volts or more depending on the embodiment, and thus "high-voltage" is indicated by subscript "HV". The electric machine 20 may be embodied as a polyphase electric motor, for instance, and thus may be electrically connected to an AC bus 123, with the electric machine 20 energized by an AC voltage (VAC) from the PIM 24. The PIM 24 in turn is connected to the battery 22 via positive (+) and negative (−) rails of a DC voltage bus 23, with a DC voltage (VDC) supplied by the DC voltage bus 23 to the PIM 24 and vice versa depending on whether the electric machine 20 functions in its capacity as a motor or as a generator.

Operation of the electrical system 15 may be regulated in real-time by the controller 50 in response to input signals (arrow $CC_I$), including a torque command (TC) indicative of a level of output torque (To) that is desired, a rotor position signal ($\theta_r$), and current signals ($I_M$) describing the individual phase currents, present operating mode (OM) of the electric machine 20 (motoring or generating), etc. The controller 50 ultimately outputs control signals (arrow CCo), which may be transmitted to the PIM 24 and various other controlled components in the electrical system 15 wirelessly and/or over low-voltage transfer conductors. The controller 50 may include a processor (P) and tangible, non-transitory memory (M), including read only memory in the form of optical, magnetic, or flash memory, with the memory (M) possibly containing the logic 55 of FIG. 9. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

Figure 2:
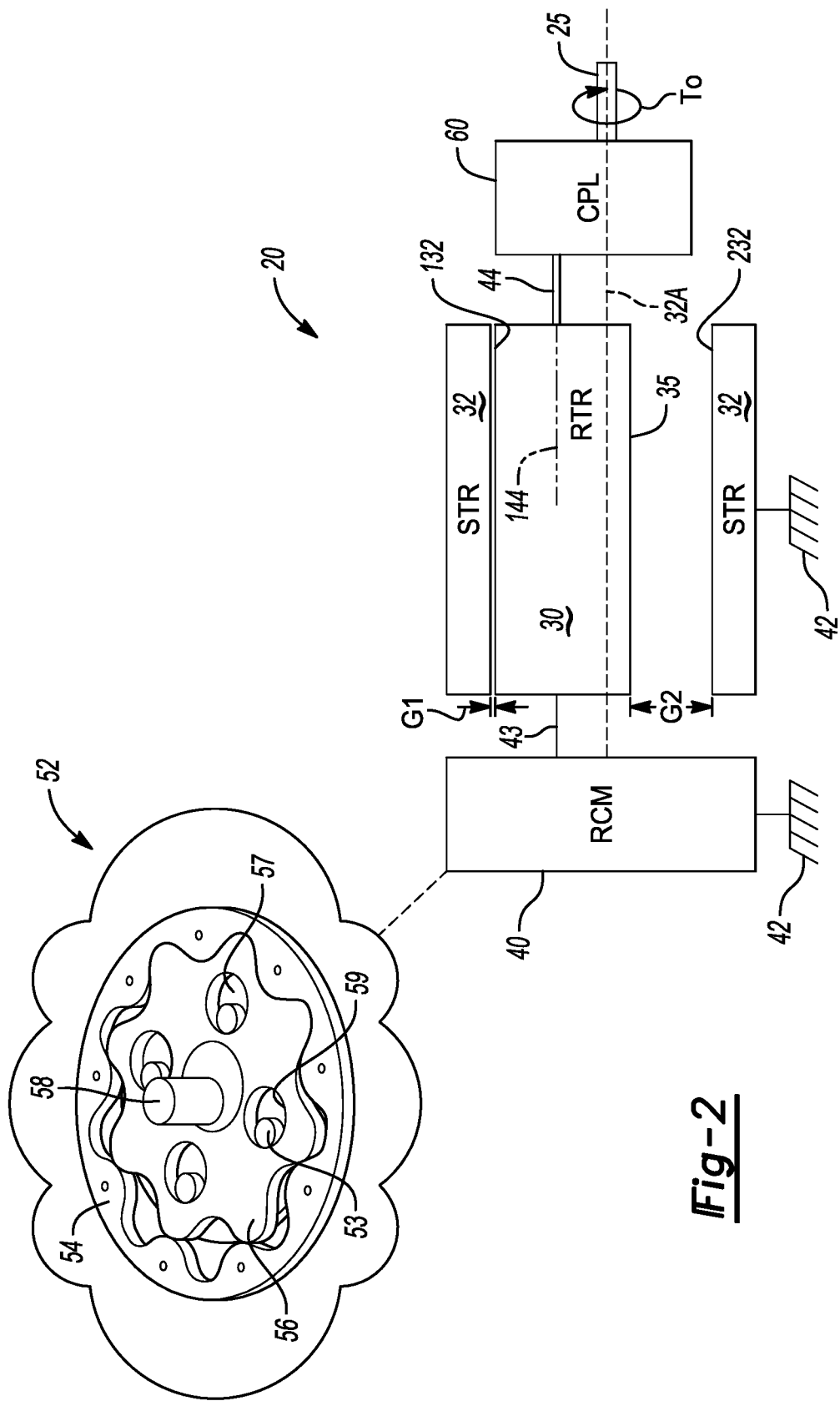
FIG. 2 is a schematic illustration of a cycloidal electric machine usable as part of the example electrical system shown in FIG. 1.

FIG. 2 schematically depicts the rotor (RTR) 30 as eccentrically-positioned and radially-disposed with respect to the stator (STR) 32, the latter of which may be connected to a stationary member 42 as shown. The electric machine 20 may include a housing (not shown) in which the rotor 30, the stator 32, and other components are disposed and structurally supported. The stator 32 may be separated from the rotor 30 by the above-noted airgap (G1, G2), with the stator 32 in continuous contact with or close proximity to the rotor 30 at an instantaneous center of rotation (COR) (see FIG. 3), i.e., the closest proximate point between the stator 32 and rotor 30, and without sliding against the rotor 30. Eccentric positioning of the rotor 30 relative to the stator 32 provides the rotor 30 with the above-noted 2DOF, i.e., rotating motion and orbiting motion.

The rotor 30 is surrounded or circumscribed by the stator 32 in the illustrated example cylindrical embodiment of FIG. 2, with an output shaft 44 of the rotor 30 free to rotate about a rotor axis 144, while the rotor 30 orbits around a center axis 32A of the stator 32, with the center axis 32A also referred to herein as the stator axis 32A. The rotor 30 and stator 32 are separated by the airgap (G1, G2), with G1 and G2 referring to the airgap's different relative size at different circumferential locations. That is, depending on the orbiting position of the rotor 30 within the stator 32 at a given time instant, the rotor 30 may approach an inner circumferential surface 132 of the stator 32, i.e., minimal airgap G1, reaching its closest point at the instantaneous center of rotation (COR).

At such a position, the airgap G2 at the illustrated instant in time is larger than airgap G1, again with airgaps G1 and G2 forming a continuous airgap of different sizes depending on the orbital position of the rotor 30. As the rotor 30 continues to orbit radially within the stator 32, however, the relative size of airgaps G1 and G2 continuously changes, i.e., the airgap G2 becomes smaller than airgap G1 as the rotor 30 orbits 180-degrees away from the relative position depicted in FIG. 2. As the size of the airgap affects output torque capability of the electric machine 20, the controller 50 of FIG. 1 is programmed to excite the stator windings of the stator 32 in a particular manner, using the specific input signals (arrow $CC_I$).

The cycloidal electric machine 20 may be connected to or integrally includes a rotor constraint mechanism (RCM) 40. The RCM 40 is configured to constrain motion of the rotor 30 such that the rotor 30 is able to generate useful application-specific torque on a coupled load. In certain embodiments, portions of the RCM 40 may be integrally formed with the structure of the rotor 30, while in other embodiments the RCM 40 may be embodied as an external set of components, e.g., portions of a cycloidal gear set 52 powering an output shaft 58 that rotates in a direction opposite to that of the output shaft 44.

Operation of the cycloidal electric machine 20 may be understood with reference to the cycloidal gear set 52, with the latter shown as an inset in FIG. 2. The cycloidal gear set 52 has a grounded/stationary outer gear element 54, within which is disposed the cycloidal disc 56. The cycloidal disc 56 defines equally-spaced holes 59. Pins 53, e.g., cylindrical posts as shown, may axially-extend from a gear element 57. The particular 2DOF motion enabled by the cycloidal gear set 52 will be appreciated by one of ordinary skill in the art, e.g., as a speed reduction mechanism.

The electrical system 15 shown schematically in FIG. 1 may incorporate certain structural functional aspects of the example cycloidal gear set 52 into its constituent structure without bodily incorporating the cycloidal gear set 52 itself. For instance, the function of the stationary outer gear element 54 and the cycloidal disc 56 may be integrated into the structure of the RCM 40, with an input member 43 of the rotor 30 possibly bolted to structure of the RCM 40 corresponding to cycloidal disc 56. Such structure enables the rotor 30 to be constrained so as to rotate about rotor axis 144 and, at the same time, to orbit about stator axis 32A. At least part of the RCM 40 may be integrally formed with the rotor 30 in certain embodiments. For instance, a profile of the rotor 30 may be constructed to approximate or match a profile of the illustrated cycloidal disc 56 of the example cycloidal gear set 52, with the stator 32 being similarly constructed to form the mating profile of the outer gear 54.

The cycloidal electric machine 20 may include an optional coupling mechanism (CPL) 60 configured to translate rotation of the rotor 30 from rotor axis 144 to the driven load 26 (see FIG. 1). The CPL 60 may be positioned downstream of the rotor 30, i.e., coupled to the output member 44 and configured to translate the 2DOF motion of the rotor 30 into 1DOF motion. As used herein, the term "1DOF motion" describes rotation of the output member 25 and the connected driven load 26 without accompanying orbiting motion. When the driven load 26 includes the above-noted drive axle or drive wheels 12 of the representative motor vehicle 10 shown in FIG. 1, for instance, the 1DOF motion of the rotor 30 ultimately powers the drive wheels 12.

Various embodiments may be envisioned for implementing the CPL 60, including but not limited to an Oldham coupling mechanism. As will be appreciated, Oldham couplings utilize a compact arrangement of discs, i.e., an input-coupled disc, an output-coupled disc, and a rotating middle disc joined to the input- and output-coupled discs by a mating tongue-and-groove connection. Alternatively, the post-and-hole configuration shown in the cycloidal gear set 52 of FIG. 2 may be used, or a gear train constructed of multiple spur gears may be employed to the same ends, with these being just a few possible ways to implement the CPL 60. Certain applications may be envisioned that make beneficial use of orbiting motion of the output member 25, e.g., when mixing cement, blending a food product, or performing another operation in which simultaneous rotation and orbiting motion is beneficial. Other possible applications may find such 2DOF motion useful, such as in propulsion systems of certain unmanned rovers or other special-purpose vehicles, or in grinders or washing machines.

Referring briefly to FIGS. 3 and 4, the above-noted 2DOF motion is represented schematically via a sequence of motion commencing at time t=0 and continuing until a future point in time t=t+1. FIG. 3 shows an example of cycloidal motion, such that the rotor 30 has rotary motion radially within the surrounding stator 32. Such motion is indicated by the changing position of an instantaneous center of rotation (COR) between t=0 and t=t+1. FIG. 4 shows orbiting motion, such that the rotor 30 effectively slides around the inner circumferential surface 132 of the stator 32. Pure rotary motion, pure orbiting motion, or combinations of rotary and orbiting motion may be used in different applications, as noted above.

Figure 6:
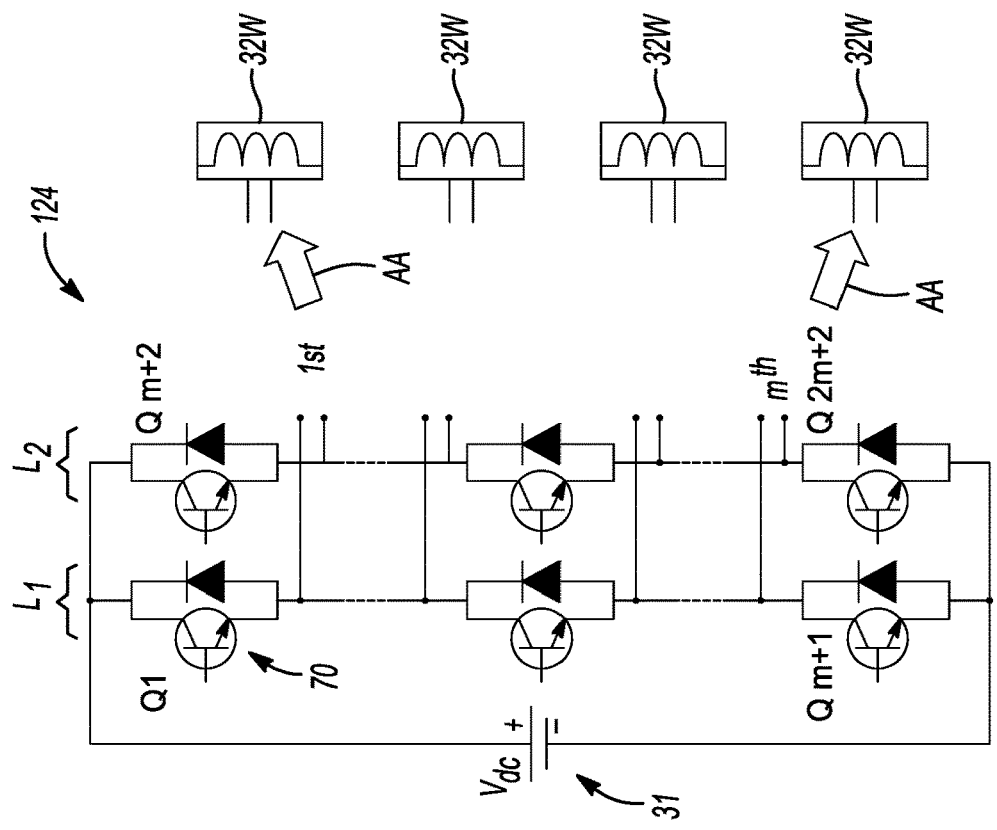
FIGS. 6 and 7 are schematic circuit diagrams usable as part of the power inverter module shown in FIG. 1.
Figure 5:
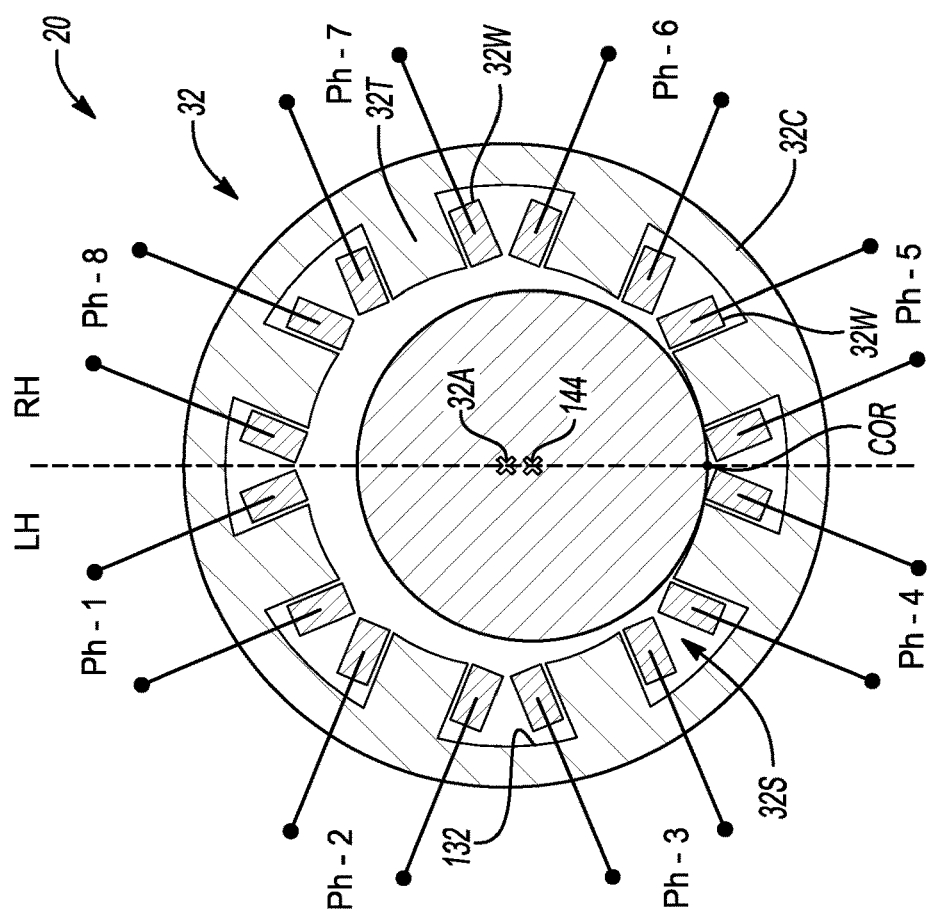
FIG. 5 is a schematic illustration of an example eight-phase cycloidal electric machine controlled via the power inverter module and controller of FIG. 1.
Figure 8:
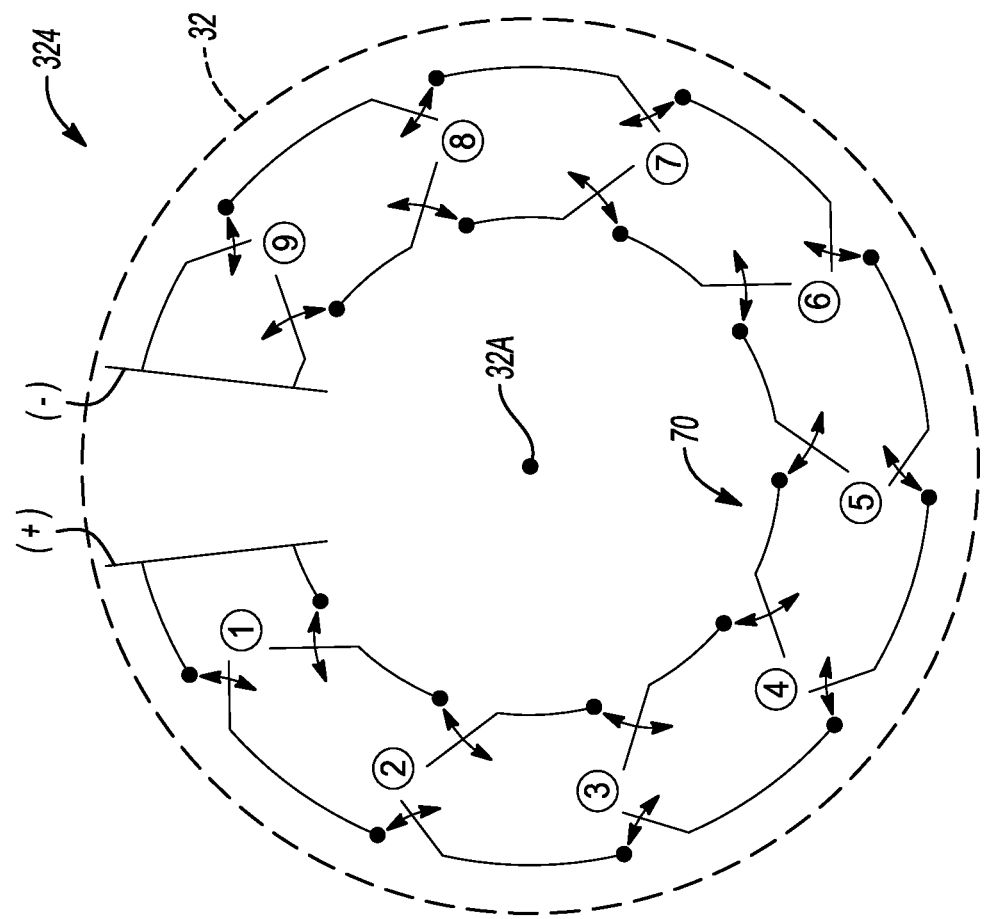
FIG. 8 is a schematic illustration of an alternative annular embodiment of phase legs usable with the cycloidal electric machine shown in FIG. 5.
Figure 7:
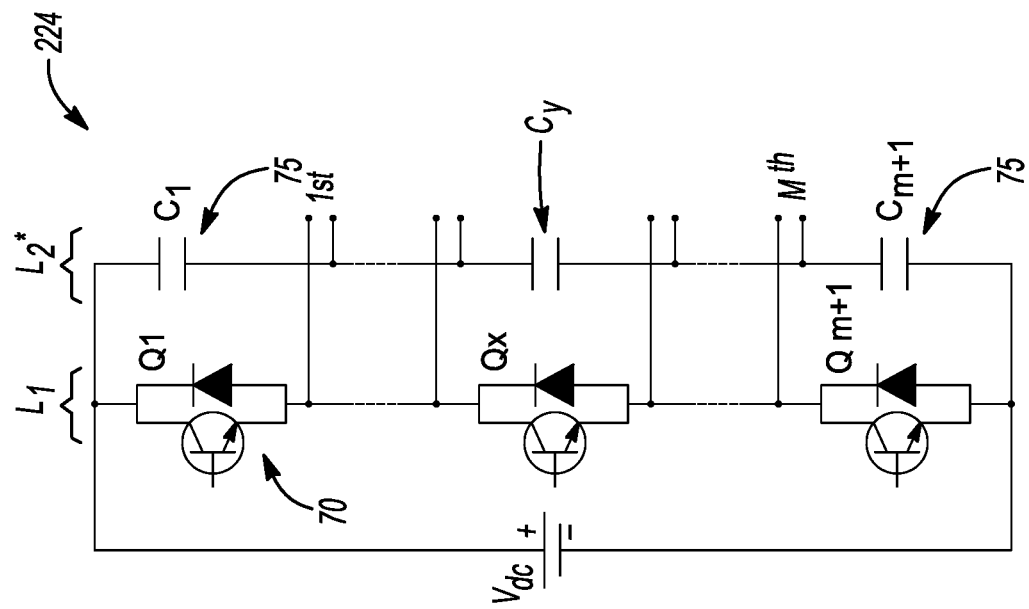

FIG. 5 depicts an eight-phase embodiment of the cycloidal electric machine 20 that may be controlled using the embodiments shown in respective FIGS. 6-8. The present PWM control technique may be performed by the controller 50 using the PWM control logic 55 of FIG. 9 to control the ON/OFF states of the various semiconductor switching arrangements 124, 224, or 324 (FIGS. 6, 7, and 8) residing within the PIM 24 of FIG. 1. The following teachings may be modified within the scope of the disclosure to include fewer or more than eight phases, and therefore the example eight-phase embodiment of FIG. 5 is non-limiting and representative of the present teachings.

The eight phases of the cycloidal electric machine 20 of FIG. 5 are progressively labeled Ph-1, Ph-2, Ph-3, . . . , Ph-8. The cycloidal electric machine 20 has symmetrical left and right halves LH and RH from the perspective an instantaneous center of rotation (COR) of the electric machine 20, with the instantaneous center of rotation being the closest point between the rotor 30 and surrounding stator 32. The rotor 30 is eccentric with respect to the stator 32, as noted above, and therefore the instantaneous center of rotation (COR) changes based on the present orbiting position of the rotor 30 radially within the stator 32.

The stator 32 has a cylindrical stator core 32C with an inner circumferential wall 132. An equal number of stator teeth 32T are located in each symmetrical half LH and RH and project radially toward the rotor 30 from the inner circumferential wall 132. Stator slots 32S defined between adjacent stator teeth 32T by laminated ferrous structure of the stator 32 are wound with copper wire or filled with bar segment conductors to form stator windings 32W, which are then energized by the controller 50 to create stator electromagnets with corresponding magnetic poles. The rotating stator field thus produces rotation of the rotor 32.

Due to the eccentricity of the rotor 30, orbiting motion of the rotor 30 about a center axis 32A of the stator 32, apart from rotation of the rotor 30 about its own center axis 32A, eccentric to the rotor axis 144, which causes the airgap to be larger at a location diametrically opposite the instantaneous center of rotation (COR) of the cycloidal electric machine 20, i.e., the point at which the stator-rotor airgap is at its minimum, relative to the size of the airgap in close proximity to the center of rotation. The controller 50 is thus configured to receive the input signals (arrow $CC_I$) of FIG. 1. Responsive to the input signals (arrow $CC_I$), the controller 50 energizes optimal stator poles or pole pairs via the PIM 24, doing so using the particular modulation methodology disclosed herein and the PWM control logic 55 depicted in FIG. 9.

Referring to FIG. 6, the PIM 24 of FIG. 1 may include a semiconductor switching arrangement 124 having semiconductor switches 70 arranged in series/end-to-end in two phase legs $L_1$ and $L_2$ connected across a DC voltage supply (Vdc) 31. The DC voltage supply 31 is connected to the battery 22 of FIG. 1, but may be at a different electric potential, as will be appreciated. The semiconductor switches 70 may be variously embodied as insulated IGBTs, MOSFETs, SiC, GaN, or other application-suitable semiconductor-based switching devices. For the m phases of the cycloidal electric machine 20 of FIG. 5, each phase leg $L_1$ and $L_2$ has m+1 semiconductor switches 70, and therefore a total of nine semiconductor switches 70 in an example eight-phase (m=8) embodiment. For instance, the phase leg $L_1$ may include nine semiconductor switches (Q1 to Qm+1) and the phase leg $L_2$ may include nine additional semiconductor switches (Qm+2 through Q2m+2), for a total of eighteen semiconductor switches 70.

With the exception of the first and last row of semiconductor switches 70 of each phase leg $L_1$ and $L_2$, the two power terminals of the various phase-corresponding semiconductor switches 70 are connected to a respective one of the stator windings 32W for the $1^{st}$ through the $m^{th}$ phase as indicated by arrows AA. The first of the semiconductor switches 70 located in each phase leg $L_1$ and $L_2$, i.e., switches Q1 and Qm+2, respectively, in FIG. 6, are tied to the positive (+) bus bar and the outputs of the last switches (Qm+1 and Q2m+2) are tied to the negative (−) bus bar.

FIG. 7 depicts an alternative semiconductor switching arrangement 224 in which the phase leg $L_2$ of FIG. 6 is replaced with an alternative phase leg $L_2^*$ of capacitors 75, i.e., C1, ..., Cy, ..., Cm+1. Phase leg $L_1$ remains as shown in FIG. 6. By replacing the semiconductor switches 70 of one of the phase legs $L_1$ and $L_2$ with capacitors 75 in this manner, the number of active components in the PIM 24 may be greatly reduced. A possible drawback to the FIG. 7 embodiment is that, although the number of semiconductor switches 70 is reduced from eighteen to nine, the maximum output voltage is likewise divided by two. However, in applications in which such a reduction is not problematic, or in those in which the bus voltage represented by the DC voltage supply 31 may be increased, the alternative embodiment of FIG. 7 may be advantageous.

Referring to FIG. 8, the inverter phase legs $L_1$ and $L_2$, parallel to each other in FIGS. 6 and 7, may be optionally shaped as an annulus or ring and arranged concentrically with respect to each other. For instance, in a semiconductor switching arrangement 324 the phase legs $L_1$ and $L_2$ may each be shaped as an annulus that surrounds or almost completely circumscribes the stator axis 32A. The PIM 24 of FIG. 1 may be likewise configured as an annulus and attached to a surface of the stator 32, e.g., at a position immediately adjacent to the stator 32, with the various semiconductor switches 70 tied directly to the corresponding phases Ph-1 through Ph-8 through the stator 32. For an eight-phase embodiment, the semiconductor switching arrangement 324 has nine semiconductor switches 70, with the nine switches nominally indicated by a corresponding circled integer.

Figure 9:
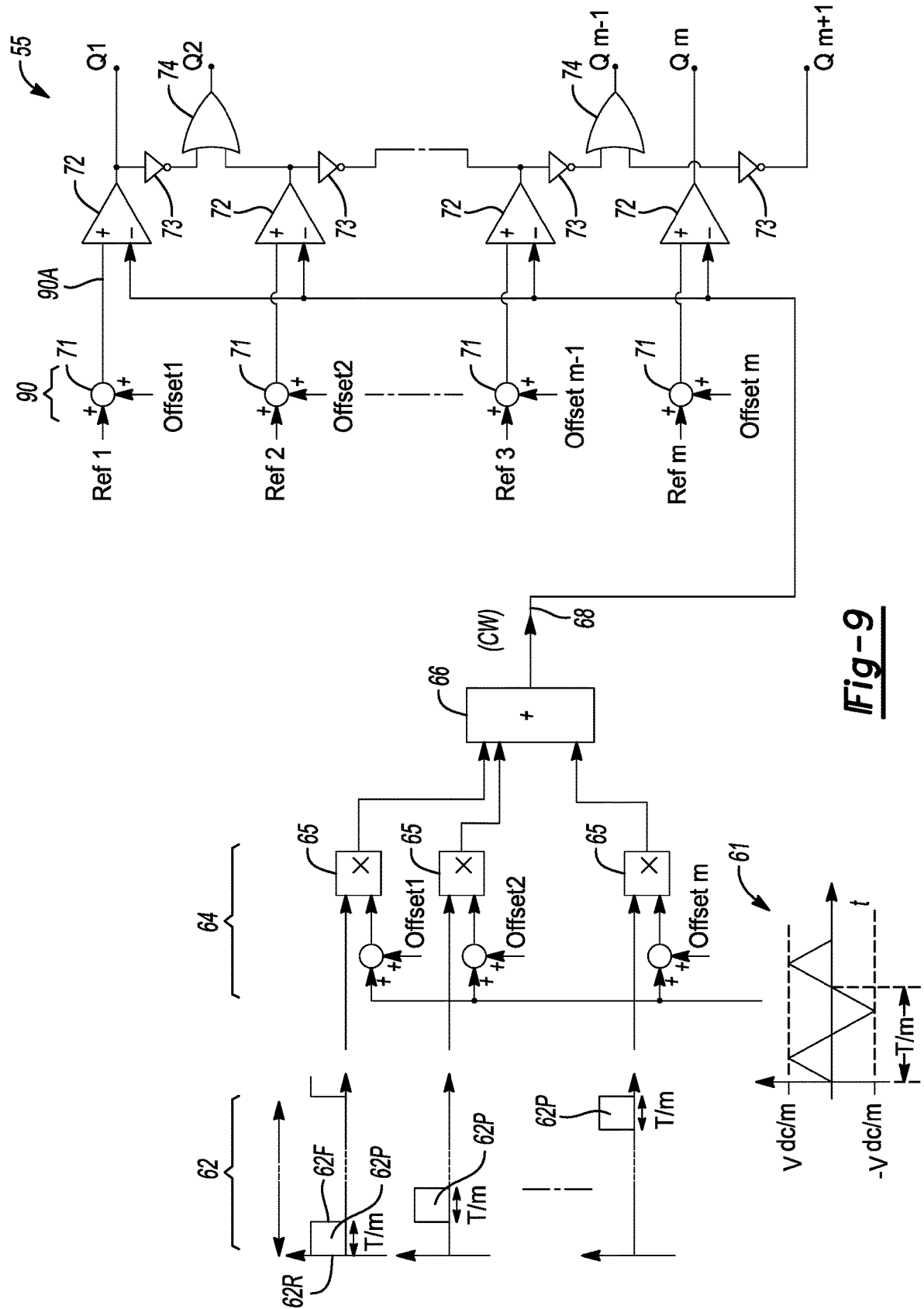
FIG. 9 is a schematic circuit diagram of logic hardware usable in performing a pulse width modulation process for control of the semiconductor switches of the power inverter module shown in FIG. 1.

Control of the semiconductor switching arrangements 124, 224, or 324 of respective FIGS. 6-8 may be accomplished by the controller 50 of FIG. 1 using the PWM control logic 55 depicted in FIG. 9. PWM techniques are used for controlling the ON/OFF switching states of power inverter switches, such as the illustrated semiconductor switches 70 of FIGS. 6-8. However, a typical PWM process involves comparing a high-frequency carrier waveform, e.g., a repeating triangular waveform, with a low-frequency reference signal such as a rectangular wave or a sine wave. A period over which the carrier waveform amplitude remains lower than that of the reference signal corresponds to width of a pulse having a binary value of 1, with 0 being the value of the pulse when the carrier amplitude exceeds that of the reference signal. The typical PWM approach is not applicable given the eccentricity of the cycloidal electric machine 20 and the particular arrangement of the semiconductor switches 70 of FIGS. 6-8.

Instead, the present PWM approach is used in which the PWM control logic 55 of FIG. 9 modifies or shapes a basic carrier signal 61 in a particular way, and such that a voltage reference signal for each phase of the cycloidal electric machine 20 is offset depending on the particular semiconductor switch 70 being controlled. That is, relative to typical PWM approaches in which there is a separate modulation space, i.e., a space covered by the amplitude of the carrier signal, for each of the available phases being controlled, the present approach is characterized by division of such a modulation space between the multiple electrical phases. The PWM control logic 55 is therefore configured to achieve such ends.

Shown at far left in FIG. 9 is a pulse signal 62 transmitted at a calibrated pulse interval T, with each pulse 62P having a pulse width of T/m, with T/m being the period of the carrier. That is, each pulse 62P has a leading/rising edge 62R and a trailing/falling edge 62F, with the leading and trailing edges 62L and 62F separated from each other by a period T/m. For successive phases, the falling edge 62F of a given pulse 62P coincides with the rising edge 62R of the next successive pulse 62P, as depicted with first and second phases and continuing to the $m^{th}$ phase. The pulse signals 62 provide a timing function for the PWM process, and thus are fed into a first offset block 64 as shown. The first offset block 64 also receives a base carrier signal 61 having a frequency m/T. The amplitude of the base carrier signal 61 varies between a calibrated positive and negative voltage, as indicated by +V dc/m and −Vdc/m. Such an approach will be appreciated by one of ordinary skill in the art of PWM.

Figure 10:
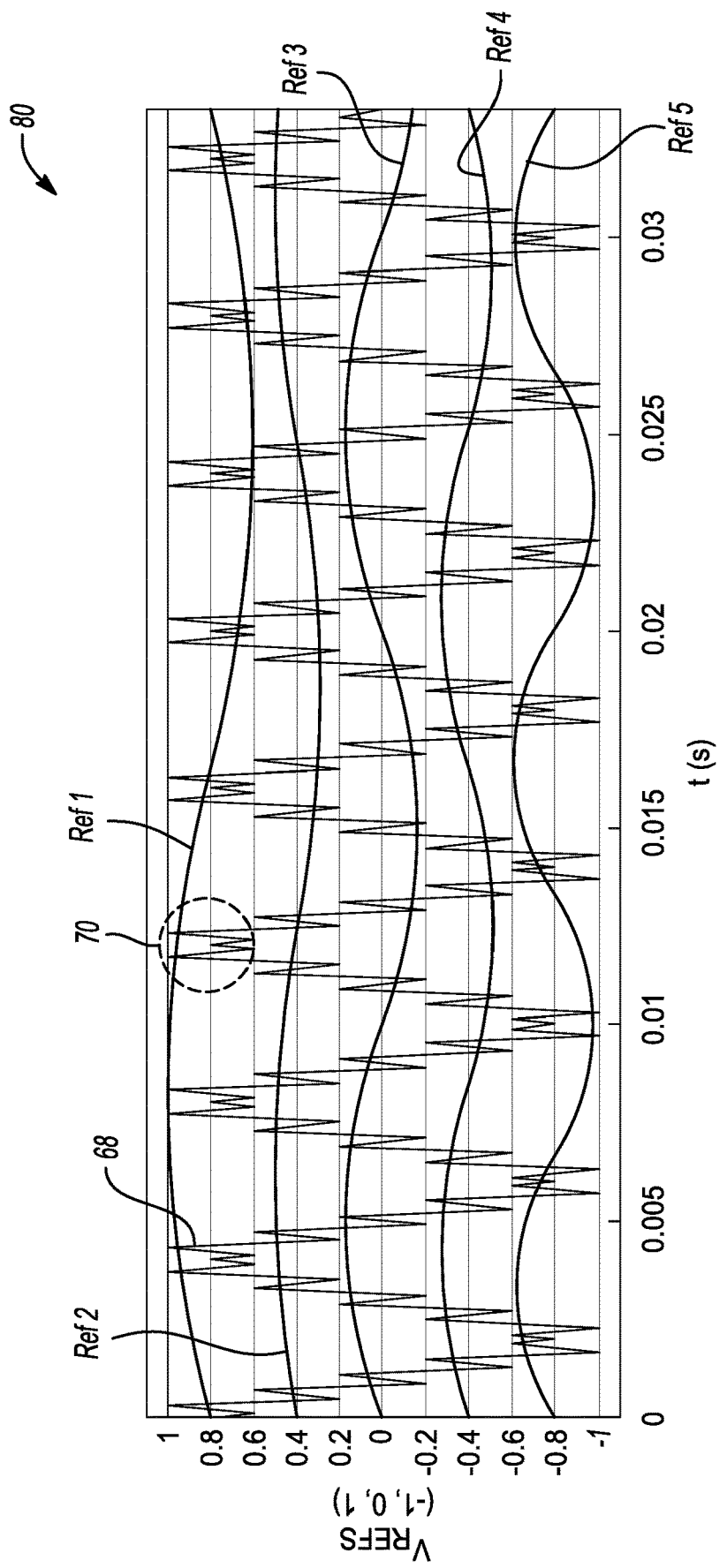
FIG. 10 is a time plot of voltage reference and carrier waveform signals used by the controller of FIG. 1 to control operation of the cycloidal electric machine.

Within the first offset block 64, the controller 50 of FIG. 1 calculates an offset value ($Offset_n$) using the following equation:

$$Offset_n = \frac{1}{m}(m + 1 - 2n)$$

where m is the number of phases in the cycloidal electrical machine 20 and n is the particular offset/phase being determined, i.e., with n varying from 1 for the first phase and m for the $m^{th}$ phase. The calculated offsets are then added to the basic carrier signal 61, fed into a multiplier node 65, and multiplied by the pulse signals 62. Thus, the basic carrier signal 61 for each phase (n), in this instance phases 1, 2, . . . , m, is adjusted by a corresponding phase-specific offset and then added together at a summation node 66. The output of the summation node 66 is a modified carrier signal waveform (CW) 68 having a jagged sawtooth profile 78 as best shown in FIG. 10.

Also shown in FIG. 9 is a second offset block 90 in which, in a manner similar to the adjustment made to the basic carrier signal 61 in the first offset block 64, the controller 50 also applies the offsets at corresponding summation nodes 71 to modify the corresponding voltage reference signals, e.g., Ref 1, Ref 2, Ref 3, . . . , Ref m. Such reference signals may be determined by rotor position, torque command, and present mode of operation of the cycloidal electric machine 20, which are included in the input signals (arrow $CC_I$) shown in FIG. 1.

The output of each of the nodes 71 is a modified reference signal 90A. Five such reference signals are shown in FIG. 10 to illustrate the effect. The reference signal is a voltage used by the controller 50 as a control signal, is described as a function, i.e.:

$$V_{REF_n} = M_n P(\omega_n t + \phi_n)$$

where M is modulation index, where $$M_1, M_2, \ldots M_m \leq \frac{1}{m}, P$$

is the pulse frequency, ω is the fundamental frequency, and φ is the phase shift.

Comparators 72 are thereafter used for each phase of the cycloidal electric machine 20, with inputs to the comparators 72 being the modified reference signal 90A and the modified carrier signal 68. The output of the comparator 72 for the first phase, i.e., a binary value or 0 or 1 depending on whether the reference signal exceeds or does not exceed the modified carrier signal 68 as noted above, is used as the gate drive signal for the first switch 70 of FIG. 6.

The output of the first comparator 72 is fed through a NOT gate 73 to an OR gate 74, the other input to which is the output of the comparator 72 for the second phase, and so forth. The gate drive terminals (Q1, Q2, . . . , Qm−1, Qm, Qm+1) are shown at far right in FIG. 9, and are tied to corresponding gate terminals of the semiconductor switches 70 located within the PIM 24 shown in FIG. 1. The disclosed teachings and use of the control logic 55 may therefore help increase overall DC bus utilization by sharing the modulation space between adjacent pole pairs, e.g., phases 1 and 2 up to phases m−1 and m. This is particularly true when the outputs of the m phases have identical frequencies as explained above.

Thus, one of ordinary skill in the art will appreciate that the controller 50 described herein is configured to apply, for each respective n phase of the m phases, a phase-specific offset value to the carrier signal 61 and to the voltage reference signal ($V_{ref}$) to thereby generate the modified carrier signal 68 and the modified reference signal 90A, respectively. The controller 50 then generates a pulse width modulation (PWM) signal as a gate drive signal using the modified carrier signal 68 and the modified reference signal 90A, and to power the cycloidal electric machine 20 via the PIM 24 by energizing the semiconductor switches 70 using the PWM signals.

Similarly, the controller 50 may execute a related method, e.g., by receiving the set of input signals (arrow $CC_I$), and then, responsive to the input signals, for each respective phase (n) of the plurality of phases (m), applying the above-described phase-specific offset value to the carrier signal 61 and the voltage reference signal (Vref) to generate the modified carrier signal 68 and modified reference signal 90A, respectively. Such a method may include generating the PWM signals 75 of FIG. 9 via the controller 50 using the respective modified carrier and reference signals 68 and 75. The method may also include transmitting the PWM signals 75 to the semiconductor switches 70 located on one or more inverter phase legs L1 and/or L2 of the PIM 24 to power the cycloidal electric machine 20.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
   a direct current (DC) voltage bus;
   an alternating current (AC) voltage bus;
   a power inverter module (PIM) connected to the DC voltage bus and to the AC voltage bus, and having a pair of inverter phase legs, at least one of which includes a plurality of semiconductor switches;
   a cycloidal electric machine with a plurality of electrical phases connected to the PIM via the AC voltage bus, and having a stator and a rotor with respective stator and rotor axes, wherein the rotor axis is eccentric with respect to the stator axis, an airgap is defined between the stator and the rotor that is smaller at a center of rotation of the rotor than elsewhere around a circumference of the rotor, and the rotor moves with two degrees of freedom (2DOF), the 2DOF including rotating motion about the rotor axis and orbiting motion about the stator axis; and
   a controller configured to apply, for each respective phase of the plurality of phases, a phase-specific offset value to a carrier signal and to a voltage reference signal to thereby generate a modified carrier signal and a modified reference signal, respectively, to generate a pulse width modulation (PWM) signal using the modified carrier signal and the modified reference signal, and to power the cycloidal electric machine via the PIM by energizing the semiconductor switches using the PWM signal.

2. The electrical system of claim 1, wherein the phase-specific offset value is calculated by the controller as:

$$Offset_n = \frac{1}{m}(m + 1 - 2n)$$

where m is a total number of the phases of the cycloidal electric machine and n is a corresponding phase for the phase-specific offset value.

3. The electrical system of claim 1, wherein the inverter phase legs include parallel first and second inverter phase legs.

4. The electrical system of claim 3, wherein the plurality of semiconductor switches includes a first plurality of semiconductor switches connected in series with each other to form the first inverter phase leg, and a second plurality of semiconductor switches connected in series with each other to form the second inverter phase leg.

5. The electrical system of claim 3, wherein the first inverter phase leg contains the plurality of semiconductor switches and the second inverter phase leg contains an equal plurality of capacitors.

6. The electrical system of claim 1, wherein the pair of inverter phase legs includes concentric first and second inverter phase legs.

7. The electrical system of claim 6, wherein concentric first and second inverter phase legs are connected to a surface of the stator at a position immediately adjacent to the stator.

8. The electrical system of claim 1, wherein the cycloidal electric machine is a reluctance machine having at least eight phases.

9. The electrical system of claim 1, further comprising a downstream coupling mechanism coupled to the rotor and a driven load, and configured to translate the 2DOF into 1DOF, wherein the 1DOF is the rotating motion without the orbiting motion.

10. The electrical system of claim 9, wherein the driven load is a drive axle of a vehicle.

11. A method for controlling a cycloidal electric machine having a plurality of phases, and a stator and a rotor with respective stator and rotor axes, wherein the rotor axis is eccentric with respect to the stator axis, an airgap is defined between the stator and the rotor that is smaller at a center of rotation of the rotor than elsewhere around a circumference of the rotor, and the rotor moves with two degrees of freedom (2DOF), the 2DOF including rotating motion about the rotor axis and orbiting motion about the stator axis, the method comprising:

receiving a set of input signals via a controller, including a torque command, a rotor position signal, and current signals;

responsive to the set of input signals for each respective phase of the plurality of phases, using a controller to apply a phase-specific offset value to a carrier signal and to a voltage reference signal and thereby generate a modified carrier signal and a modified reference signal, respectively;

generating a pulse width modulation (PWM) signal via the controller using the modified carrier signal and the modified reference signal; and transmitting the PWM signal to a plurality of semiconductor switches located on one or more phase legs of a power inverter module connected to the cycloidal electric machine to thereby power the cycloidal electric machine.

12. The method of claim 11, further comprising calculating the phase-specific offset value as:

$$Offset_n = \frac{1}{m}(m + 1 - 2n)$$

where m is a total number of the phases of the cycloidal electric machine and n is a corresponding phase for the phase-specific offset value.

13. The method of claim 11, wherein the power inverter module includes parallel first and second inverter phase legs, a first plurality of semiconductor switches is connected in series with each other to form the first inverter phase leg, and a second plurality of semiconductor switches connected in series with each other to form the second inverter phase leg.

14. The method of claim 11, wherein the power inverter module includes parallel first and second inverter phase legs, the first inverter phase leg contains the plurality of semiconductor switches, and the second inverter phase leg contains an equal plurality of capacitors.

15. The method of claim 11, wherein the power inverter module includes concentric first and second inverter phase legs.

16. The method of claim 15, further comprising connecting the concentric first and second inverter phase legs to a surface of the stator at a position immediately adjacent to the stator.

17. The method of claim 11, wherein the cycloidal electric machine is a reluctance machine having at least eight phases.

18. The method of claim 11, further comprising connecting a downstream coupling mechanism to the rotor and a driven load, and translating the 2DOF into 1DOF via the downstream coupling mechanism, wherein the 1DOF is the rotating motion without the orbiting motion.

19. The method of claim 18, wherein the driven load is a drive axle of a vehicle.

\* \* \* \* \*